United States Patent
Fitch et al.

(10) Patent No.: US 10,313,112 B2
(45) Date of Patent: *Jun. 4, 2019

(54) BROWSER SECURITY MODULE

(71) Applicant: Amazon Technologies, Inc., Reno, NV (US)

(72) Inventors: Nathan R. Fitch, Seattle, WA (US); Gregory B. Roth, Seattle, WA (US); Graeme D. Baer, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 62 days.

This patent is subject to a terminal disclaimer.

(21) Appl. No.: 14/980,033

(22) Filed: Dec. 28, 2015

(65) Prior Publication Data
US 2017/0187521 A1 Jun. 29, 2017
US 2017/0373840 A9 Dec. 28, 2017

Related U.S. Application Data

(63) Continuation of application No. 13/312,774, filed on Dec. 6, 2011, now Pat. No. 9,225,690.

(51) Int. Cl.
H04L 9/08 (2006.01)
H04L 9/32 (2006.01)
(Continued)

(52) U.S. Cl.
CPC ........... *H04L 9/085* (2013.01); *H04L 9/0825* (2013.01); *H04L 9/3226* (2013.01);
(Continued)

(58) Field of Classification Search
CPC ........................................................ H04L 9/085
(Continued)

(56) References Cited

U.S. PATENT DOCUMENTS 6,263,446 B1 * 7/2001 Kausik ................ G06F 21/6245
380/259
8,099,598 B1 * 1/2012 Liu ......................... H04L 9/006
380/255

(Continued)

OTHER PUBLICATIONS

Lee et al., "An Anti-phishing User Authentication Scheme without Using a Sensitive Key Table," 2011 Seventh International Conference on Intelligent Information Hiding and Multimedia Signal Processing Year: 2011.*

(Continued)

*Primary Examiner* — Roderick Tolentino
(74) *Attorney, Agent, or Firm* — Hogan Lovells US LLP

(57) ABSTRACT

Authenticated requests can be sent without requiring the requests to include or potentially expose secret information used for the authentication process. A client device use a security credential such as a key to sign a request to be sent to a recipient. When the request is received, the recipient determines whether the request was signed using the correct key for the sender. In some embodiments a client token is included with the request that statelessly encodes the key, enabling a recipient capable of decoding the client token to determine the key and compare that key to the signature of the request. The sender can store the secret information in a secure location, such as a browser security module, such that the secret information is not exposed to the browser or script executing on the client device.

20 Claims, 6 Drawing Sheets

(51) Int. Cl.
*H04L 29/06* (2006.01)
*H04L 29/08* (2006.01)

(52) U.S. Cl.
CPC .......... *H04L 9/3234* (2013.01); *H04L 9/3247* (2013.01); *H04L 63/0428* (2013.01); *H04L 63/06* (2013.01); *H04L 67/02* (2013.01)

(58) Field of Classification Search
USPC ...................................................... 726/2–10
See application file for complete search history.

(56) References Cited

U.S. PATENT DOCUMENTS

| | | | |
|---|---|---|---|
| 8,291,227 B2 | 10/2012 | Parkinson | |
| 8,364,968 B2 | 1/2013 | Corcoran et al. | |
| 2001/0049786 A1* | 12/2001 | Harrison | G06F 21/6218 713/156 |
| 2002/0069365 A1 | 6/2002 | Howard et al. | |
| 2009/0106556 A1 | 4/2009 | Hamid et al. | |
| 2009/0240936 A1 | 9/2009 | Lambiase et al. | |
| 2010/0023757 A1* | 1/2010 | Nguyen-Huu | H04L 9/083 713/156 |
| 2011/0010553 A1* | 1/2011 | Cahn | H04L 63/0823 713/175 |
| 2012/0023160 A1* | 1/2012 | Marmor | H04L 67/2823 709/203 |
| 2012/0304044 A1* | 11/2012 | Leithead | G06F 9/541 715/205 |
| 2013/0007456 A1 | 1/2013 | Dean et al. | |
| 2013/0013990 A1 | 1/2013 | Green et al. | |
| 2013/0055369 A1* | 2/2013 | Kumar | H04L 9/3247 726/7 |
| 2013/0061281 A1 | 3/2013 | Pao et al. | |
| 2014/0173749 A1 | 6/2014 | Raley et al. | |
| 2014/0259133 A1* | 9/2014 | Alonso Diaz | H04L 63/0421 726/6 |
| 2015/0235011 A1* | 8/2015 | Swaminathan | H04L 63/0815 713/171 |
| 2016/0182563 A1* | 6/2016 | Sambandam | H04L 63/123 726/22 |

OTHER PUBLICATIONS

Accomero et al., "Privacy-enhanced identity via browser extensions and linking services," 2011 5th International Conference on Network and System Security Year: 2011.*
U.S. Notice of Allowance issued in U.S. Appl. No. 13/312,774 dated Sep. 8, 2015.
U.S. Non-Final Office Action issued in U.S. Appl. No. 13/312,774 dated Mar. 24, 2015.
U.S. Final Office Action issued in U.S. Appl. No. 13/312,774 dated Oct. 22, 2014.
U.S. Non-Final Office Action issued in U.S. Appl. No. 13/312,774 dated Mar. 25, 2014.
U.S. Final Office Action issued in U.S. Appl. No. 13/312,774 dated Dec. 5, 2013.
U.S. Non-Final Office Action issued in U.S. Appl. No. 13/312,774 dated May 8, 2013.

* cited by examiner

BROWSER SECURITY MODULE

CROSS-REFERENCE TO RELATED APPLICATIONS

This application is a continuation application of U.S. Non-provisional application Ser. No. 13/312,774, now U.S. Pat. No. 9,225,690, filed Dec. 6, 2011, entitled "BROWSER SECURITY MODULE," which is incorporated herein by reference in its entirety for all purposes.

BACKGROUND

Users are increasingly utilizing electronic devices and services to obtain various types of information and perform various actions. In many cases, a user will obtain security credentials that enable that user to communicate with another party over a network in a way that enables the recipient to authenticate an identity of the sender, and prevents unintended recipients from accessing information it the communications. Oftentimes, however, the security credentials are sent along with the communication. For example, a security approach using a cookie or session token typically requires that the cookie or token be sent with any request for a given session. Such an approach is not optimal in many situations, as the secure information is transmitted outside the protected environment of the user. Any party receiving the secure information, either by intercepting a communication or causing a recipient machine to forward or redirect a communication, for example, can potentially impersonate the user by including the secure information in a subsequent request.

BRIEF DESCRIPTION OF THE DRAWINGS

Various embodiments in accordance with the present disclosure will be described with reference to the drawings, in which.

DETAILED DESCRIPTION

Figure 1:
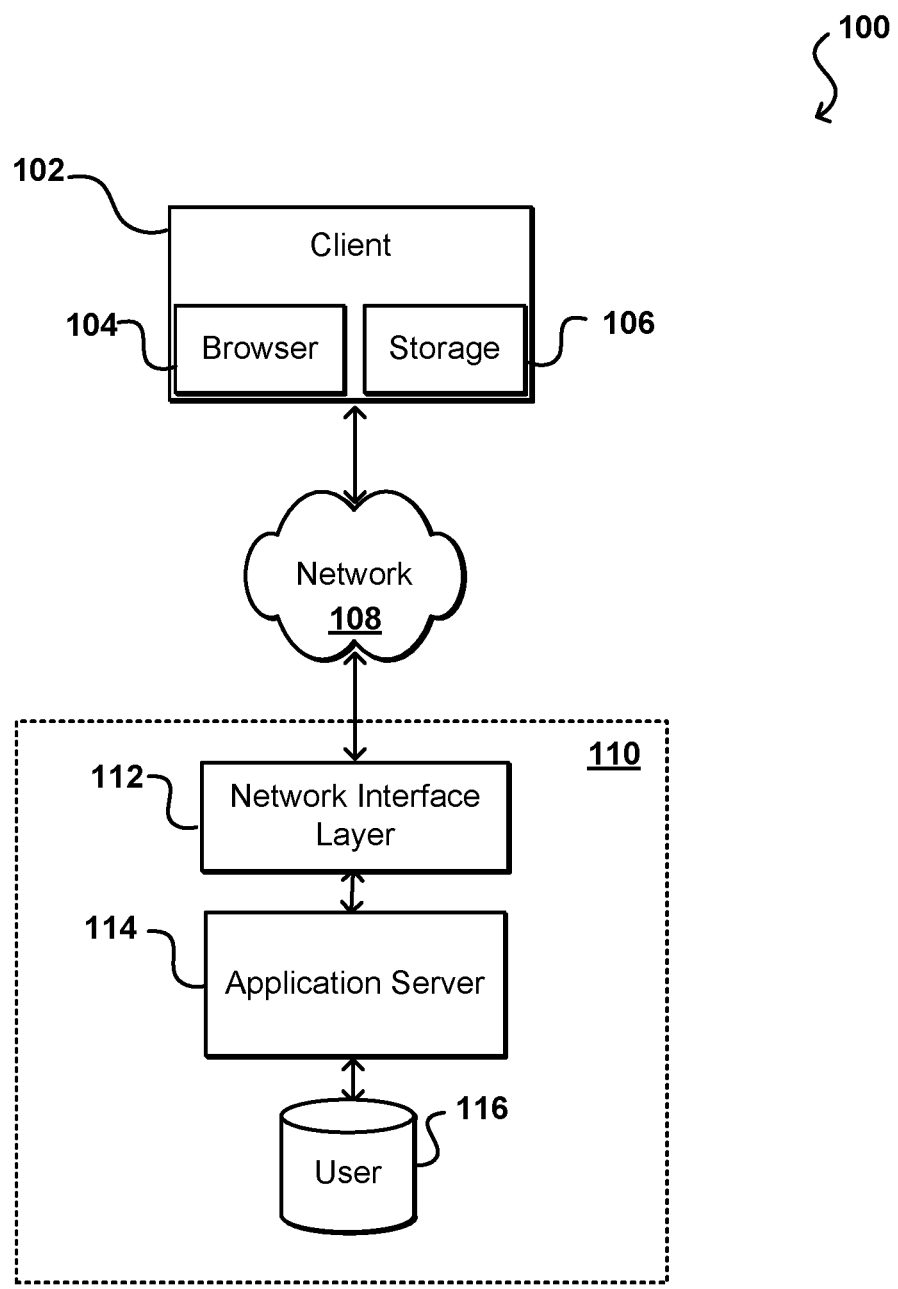
FIG. 1 illustrates an example environment in which aspects of the various embodiments can be that can be utilized.

Systems and methods in accordance with various embodiments of the present disclosure overcome one or more of the above-referenced and other deficiencies in conventional approaches to performing authentication in an electronic environment. In particular, various embodiments provide stateless and secure authorization approaches for electronic communications. In various embodiments, a request can be signed with secret information without also exposing that secret information to anyone receiving or intercepting a copy of the request. Further, the requests can be sent using a proxy or other such component limiting access to user information in the request.

Various embodiments enable a client or other sender of a request to be authenticated by utilizing various credentials, which can in at least some embodiments include a "shared" secret, such as a symmetric key, a randomly generated alphanumerical sequence, or other such identifier that can be used to authenticate a source of communications. A client device in accordance with various embodiments can sign a request using a key or other such secret, with the signed request being configured such that the key is not derivable from the request without additional information. For example, the request might also include a client token that statelessly encodes the key. The client token can be persisted by a browser on the client device, for example, and presented along with the signed request to enable the recipient to verify the signature and establish identity. The fact that the request was signed using the shared secret can enable a recipient to authenticate the identity of the sender through the fact that the sender has access to, or possession of, the key or other shared secret. In some embodiments, the recipient can store a shared secret for use in analyzing the received request. In other embodiments, the request can include a token that is encrypted using a public key or other security information known by the intended recipient. The intended recipient can decrypt the token using the public key to extract the shared secret, and then can compare the secret in the token to the secret used to sign the request. Such an approach can enable the authentication to be stateless, as the recipient does not need to store the secret for the user on the current session.

In some embodiments, a client device can store security credentials in local storage, which can be used by an active script such as JavaScript® to sign requests. In the same or other embodiments, the credentials, along with policies for accessing or utilizing those credentials can be received by and stored to a security module that can be accessed by the JavaScript using an appropriate pointer or address. When the JavaScript needs to send an authenticated request, the JavaScript can contact the security module to have the module sign the request. The security module can sign a canonicalized version of the request, for example, sending only the signature but not the secret to the intended destination. The recipient can construct the same canonicalized version of the request and verify the signature, providing authentication without requiring the shared secret being sent with the request. Such an approach prevents the JavaScript, the client browser, content to be executed in a browser application, or other such components from having access to the security credentials.

In at least some embodiments, the security module is a browser security module ("BSM") that is specifically configured to work with a browser application, such as may enable a user to access and/or execute content obtained over an appropriate network, such as the Internet. Conventional browsers restrict, and in many cases prevent, communication across different domains. A BSM, on the other hand, can enable cross-domain access to credentials that are being stored by the BSM, such as to enable access by domains other that the domain that originally had access to the secret or caused the secret to be generated. The BSM (or a user able to access the BSM) can define various permissions within the context of the browser, enabling varying levels of permissions on the use of secrets stored within the BSM. The BSM can also have bindings to active script or other content to be executed or rendered, enabling one or more sets of defined operations to be able to utilize the credentials stored in the BSM without being able to obtain the credentials.

In at least some embodiments, a BSM can also act as a filtering and/or transform agent for outbound requests and inbound responses, or other such messages. A BSM can be configured to intercept outbound requests generated by active content (or active script, etc.) executing in a browser, for example, as well as inbound responses directed to, but not yet received by, that active content. When active content generates a request, for example, the request can indicate that the request is to be signed using specific credentials stored by the BSM. When the BSM intercepts the request, the BSM can remove that information and cause the request to instead be signed with those credentials. An advantage of having the BSM intercept the request from the active content, instead of passing a signed request to the active content for transmission, is that the BSM can determine where the data is being sent and prevent the active content from sending the data to a different location. The BSM then has a level of control over the use of the signed request since the active content never has access to the signed request. A similar process can be performed by the BSM to remove credentials from a received, signed response and ensure that the response to be received by the active content is from an expected domain or location, etc.

Various other functions and advantages are described and suggested below as may be provided in accordance with the various embodiments.

FIG. 1 illustrates an example environment 100 in which aspects of the various embodiments can be implemented. In this example, a client device 102 is operable to execute a browser 104 or other such interface or application that is able to send and receive requests across at least one network 108. The client device can be any appropriate computing device capable of receiving, determining, and/or processing input, as may include a tablet computer, a smart phone, an electronic book reader, a desktop computer, a notebook computer, a personal data assistant, a smart phone, a video gaming console, a television set top box, or a portable media player. In at least one embodiment, the browser 104 is a Web browser operable to submit requests (e.g., HTTP requests) to a destination across the Internet, as may involve multiple networks such as wireless data networks, cellular networks, and the like. In the example illustrated in FIG. 1, the request can be directed to another entity 110 that is operable to receive and process the request, and return an appropriate response. The request might be directed to a Web service provided by the entity 110, for example, where the request might be received to one of a set of application programming interfaces (APIs) or other such interfaces of a network interface layer 112, which can cause information for the request to be directed to an appropriate application server 114 or other such component that includes logic and/or instructions for processing information in the request.

For many types of requests, calls, or other such transmissions over a network 108, it can be desired to authenticate a source of the request and/or protect the information in the request from being available to an unintended third party. In some embodiments, a secure connection (e.g., TSL or SSL) might be used to attempt to prevent unauthorized access to the information transmitted over that connection. Using a conventional approach, the client 102 and a server of the provider can attempt to establish a stateful connection, such as by the client requesting a secure connection and potentially providing one or more ciphers or hash functions from which the server can select to establish the stateful connection. In addition to notification of the selection, the server can send back one or more types of security information to enable the client and server to be able to trust an identity of the source or recipient of a transmission. The security information can include, for example, a token or digital certificate, which can include information such as a name or identity of the server and a public encryption key for the server. In some embodiments, the client device 102 might contact an authority alleged to have issued the certificate in order to ensure that the certificate is valid. If the certificate is valid, the client device can generate one or more session keys to be used for the secure connection. The client can select information (e.g., a random alphanumeric sequence) and encrypt that information using the public key received from the server, such that the information can only be decrypted by someone having access to the public key. Once both parties have the appropriate information, such as may be stored locally in local storage 106 on the client device and in a user or session data store 116 in the provider environment, the secure connection can be established whereby information is encrypted using the established parameters for the connection.

Other approaches to providing authentication and/or security can be utilized as well. For example, the browser can cause a browser cookie or other such digital object to be stored in local storage 106, where that browser cookie is associated with, for example, a Web service executed by an application server 114 of the provider 110. As should be understood, the Web service can be provided in a shared resource environment (e.g., via cloud computing) such that there can be multiple application servers or server instances that receive and process requests on the same session. The cookie can be used to store information such as user identity information and session state information. The browser can cause a copy of the cookie to be sent with each request in order to enable the receiving server (or other such computing device) to perform authentication, identity validation, or any other such process.

A potential downside to approaches such as those discussed above is that the token, cookie, or other "secret" information used for purposes such as security and authorization must be transmitted between the client and the server in FIG. 1. When this "shared secret" is sent across the network 108, however, the secret is out of the control of the user of the client device and the provider of the Web service, and thus is susceptible to being intercepted by a third party. A third party having access to the shared secret can potentially use the information in the secret to impersonate the client device or Web service, for example, in order to perform any of a number of undesirable actions, such as to obtain access to secure data, engage in unapproved transactions, etc. Further, the Web service (or other such system or service) often will proxy all information through the network interface layer 112 or other such front-end components. In order for the client to utilize the Web service, then, the provider will have access to the data for the user of the client device for some period of time.

Systems and methods in accordance with various embodiments overcome at least some of these and other deficiencies in existing approaches to securing the transfer of digital information by providing for a stateless and secure authorization process. Approaches described herein can provide for authentication and authorization by including information with the request that enables the other party to the communication to determine possession of the shared secret by the sender. Because the secret cannot readily be determined from the request, even in a case where a compromised browser causes a request to be sent to an undesirable destination, the recipient of that request cannot impersonate the sender of the request. Such an approach can provide a greater level of security, as the secret is not (at least intentionally) sent outside the control of the parties to the communication.

One potential approach would be to enable script executing in the browser (e.g., JavaScript) to access the secret information. A potential downside to such an approach, however, is that browser applications typically only have a limited amount of trust with respect to secret information, and are subject to being compromised. Users often would prefer to have a greater level of control over the secrets and when, or how, the secrets are used.

Figure 2:
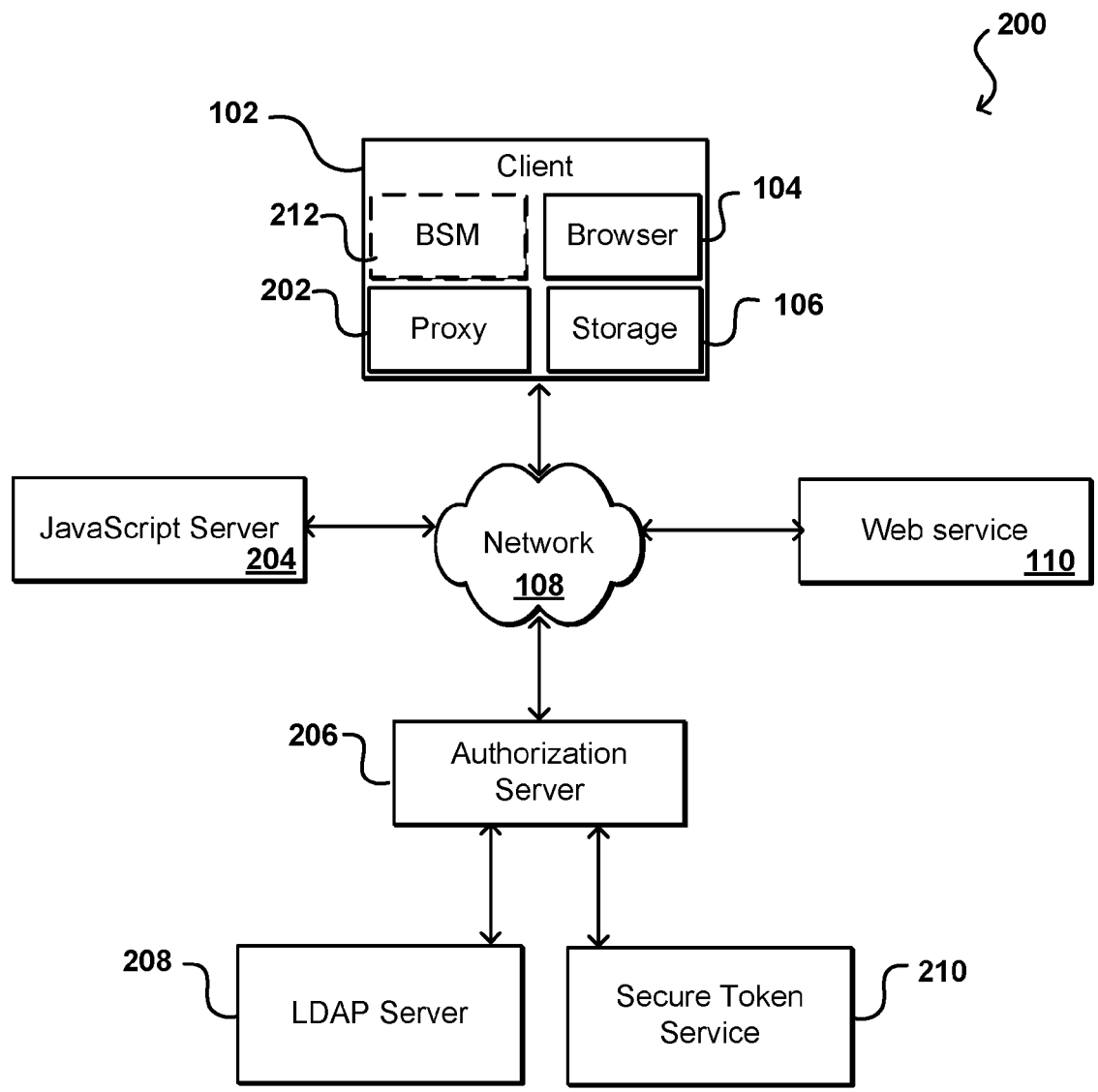
FIG. 2 illustrates an example system for authorizing requests without exposing secret information that can be utilized in accordance with various embodiments.

FIG. 2 illustrates an example of an environment 200 that can be used to provide direct access to a Web service 110 or other such entity while not having to expose a shared secret as part of that access. Similar reference numbers are carried over between figures for purposes of simplicity of explanation, but it should be understood that this is done merely for convenience and is not intended to limit the scope of variations of the various embodiments presented herein. In this example, a user does not login to a session of a Web service through that Web service 110 but instead utilizes an authorization server 206 (or service) to utilize federated identity management for the session authentication and login. For example, a user wanting to access a Web service would first be directed to work with an authentication server 206, or internal authentication stack, able to act as a federation proxy and authenticate the user to, for example, a federated identity system 208 (e.g., a lightweight directory access protocol (LDAP) server) or other such system or device. In one example, the user might obtain a page through a browser 104 on the client device 102 that is associated with the authorization server 206. The user could, for example, enter a username and password, or other security information, in order to be authenticated to the federated identity system 208. The authorization server can get a response back from the federated identity system that the user has been authenticated, and can obtain any appropriate permissions or other such information for the user on the session. In this example, the authorization server 206 (or federated identity system) also contacts an entity such as a secure token service 210 to obtain federated credentials, as may include an access key ID, a secret, and a secure token, and/or other such temporary security information, based at least in part on the permissions. The authorization server 206 then can bundle the permissions, identity information, and the temporary set of credentials associated with the identity information, and return that information to the browser 104 on the client device 102. In some embodiments, the credentials can be passed to the browser application through a URL, where any information after an HTML fragment (e.g., a hash mark or pound sign) or other such element can be received by the browser but will not be sent by the browser over the network 108.

The URL passed back to the browser 104 of the client device can redirect the browser (i.e., cause the browser to send a request for content) to a JavaScript server 204, or other such script or content provider system or service, for purposes such as JavaScript login to the Web service 110. Because the browser will receive but not send any information after an HTML fragment, the browser can hold the credential information. The URL used to contact the JavaScript browser will not have the information after the HTML fragment, such that the secret information is not shared with the JavaScript server. The JavaScript server 204 can return JavaScript code that, when executed via the browser 104 on the client device 102, causes the credentials (e.g., access key ID, secret, and token that were listed in the URL) to be stored to local storage 106, such as in an HTML5 repository. The credentials can still be located in the URL bar of the browser, for example, even though those values were not sent out with the request to the JavaScript server. The JavaScript code can pull the credential values from the URL bar and store them appropriately. In this embodiment, the JavaScript and browser on the client device will have access to the credentials, but the credentials will not be sent to the JavaScript server 204 for login or other such purposes. In other embodiments, there might be a separate message from the authorization server 206 to the client device 102 to indicate to the client to store the credentials in a secure place. In some embodiments, JavaScript from the authorization server 206, or authorization proxy, can be used to perform the storage.

After the credentials have been obtained and stored in local storage on the client device and the appropriate JavaScript has been obtained, the JavaScript can display a page or other grouping of content to the user enabling the user of the client device to perform one or more tasks. In this example, the script on the page can know where to access the credentials. When the user performs an action that causes a request to be generated and sent to the Web service 110, for example, the JavaScript can obtain the necessary credentials (e.g., ID, secret, and token), and canonicalize or otherwise transform the request as necessary. The request then can be signed using the secret, without the secret actually being sent with the request. In this example, a component such as a flash proxy 202 can be used to send the request across the network 108 to the appropriate Web service 110.

In some embodiments, the Web service can know the secret such that the Web service can properly decrypt the message. By being able to decrypt the request using the long term secret, the Web service can verify that the client has the secret, else the message could not have been encrypted using that secret. In some embodiments, the token might be an encrypted token that contains the identity information and the long term secret used to encrypt the request, in addition to any state or session information. In some embodiments, the secure token service and Web service share the token encryption key, such that the Web service can verify the user has the long term secret when an appropriately encrypted message is received.

Further, although a flash proxy 202 is used in this example, there could be any appropriate proxy or component used to communicate with the Web service 110 or other such entity. In the case of cross-link support, such as may be enabled by adding JavaScript-specific headers to the Web service, the communication could potentially be made directly instead.

Figure 3:
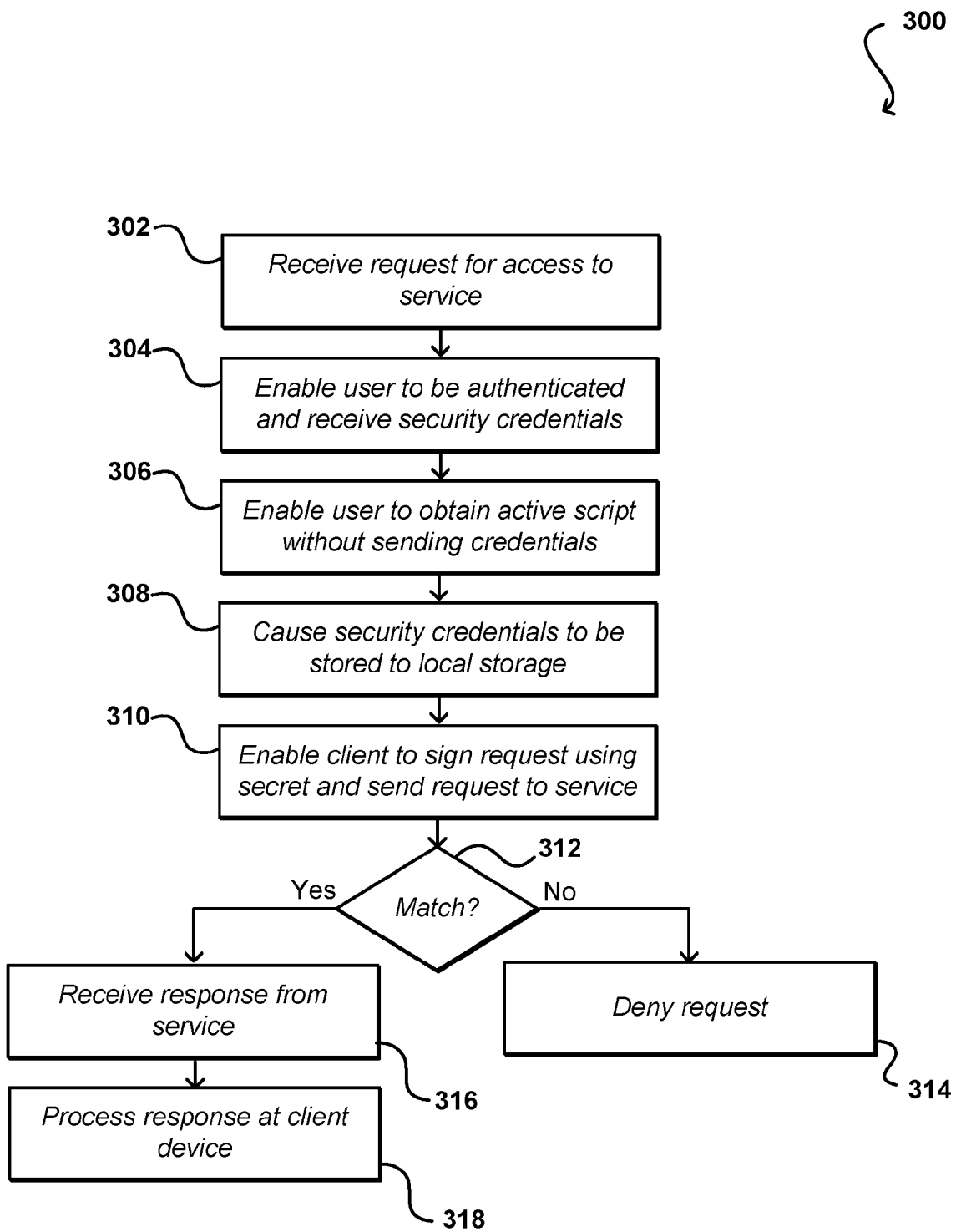
FIG. 3 illustrates a first example process for enabling a request to be authenticated in accordance with various embodiments.

FIG. 3 illustrates an overview of an example process 300 for providing authorization that can be used in accordance with various embodiments. It should be understood that there can be fewer, additional, or alternative steps performed in similar, or alternative, orders within the scope of the various embodiments unless otherwise stated. In this example, a request is received 302 from a user of a client device to access a resource, in this example a Web service. The user is caused 304, such as through browser direction, to access an authorization service, federation proxy, or other such portal enabling the user to be authenticated and receive security credentials. As discussed, this can include the user providing information such as a username and a password to a federated identity system or other such device, and then receiving federated credentials such as a shared secret and a security token from an STS or other such source. The client device, upon receiving the security credentials from the authorization service, can be redirected 306 to a scripting service or script login server operable to provide script (e.g., JavaScript) that can be executed in a browser or other such interface environment on the client device. As discussed, the security credentials will not be passed with the request to the scripting service. Upon the client device receiving the script from the scripting service the client device can be caused 308, such as via the script when executed on the client device, to store the security credentials in local storage on the client device. The JavaScript can also include instructions for accessing the Web service. The client device can be caused 310, via a flash proxy or other such component, to use the secret (e.g., a key) to sign a request (using a JavaScript library, etc.) to be sent to the desired Web service. As mentioned, the key will not be sent with the request in many embodiments, or might be sent inside an encrypted client token able to be decrypted by the Web service in other embodiments. The client token can be any appropriate token, such as a cookie or HTML5 object in some embodiments. If the Web service determines that the request is not signed with a secret that matches 312 the stored secret (or secret contained in the encrypted client token), the Web service can deny the request 314. If the secret used to sign the request matches the secret associated with the user or client device at the Web service, a request can be received 316 to the client device from the Web service. The client device (via the JavaScript or otherwise) then can process 318 the response from the Web service.

While such an approach can provide a sufficient level of security for certain users or environments, some users might still be concerned that the JavaScript obtained from the JavaScript server has access to the security credentials when stored in local storage. Accordingly, approaches in accordance with various embodiments can store the credentials to a location that is not accessible to the JavaScript or browser application. Such a location in accordance with various embodiments will be referred to herein as a browser security module (BSM). As illustrated in FIG. 2, the BSM 212 can exist on the client device. When the client device receives security credentials, such as a shared secret, from a source such as an authorization service, the client can cause the secret to be stored to the BSM. In some embodiments, a response from the authentication service can include JavaScript or other script capable of causing the shared secret to be stored to the BSM. This JavaScript will be separate from the JavaScript received from the scripting service, in order to prevent the script (from the scripting service) from ever having access to the shared secret. Instead, the script from the scripting service can be provided with a pointer to the BSM.

A browser security module can be implemented in hardware and/or software, as part of or separate from the browser itself. The BSM can take the form of a hardware chip, a module in an operating system, a plug-in card, an external TCP/IP security device, or another such component. The BSM can include an interface enabling script of the browser (or another such application) to utilize the BSM. One or more bindings can be provided to enable the JavaScript to access the BSM. Any appropriate cryptography API (e.g., OpenSSL or JCE/JCA) can be used with a BSM in accordance with various embodiments.

When the script on the client device needs to sign a request with the shared secret, the script can canonicalize the request and then call or otherwise contact the BSM asking the BSM to sign the request with the secret. The BSM can sign the request using the stored secret, without exposing that secret to the script on the client device. The request can also be marshalled as appropriate to place the request in an appropriate format for transmission to the Web service. In at least some embodiments, the request signed by the BSM can be provided to a flash proxy 202 as illustrated in FIG. 2 to send the request to the target Web service (or other such location). A flash proxy can be advantageous in at least some embodiments to enable a client device to work with multiple domains, as various browsers have restrictions on cross-domain communication as known in the art. The flash proxy can call the Web service and get a response, then hand that response to the JavaScript executing in the browser on the client device to process the information in the response.

Figure 4:
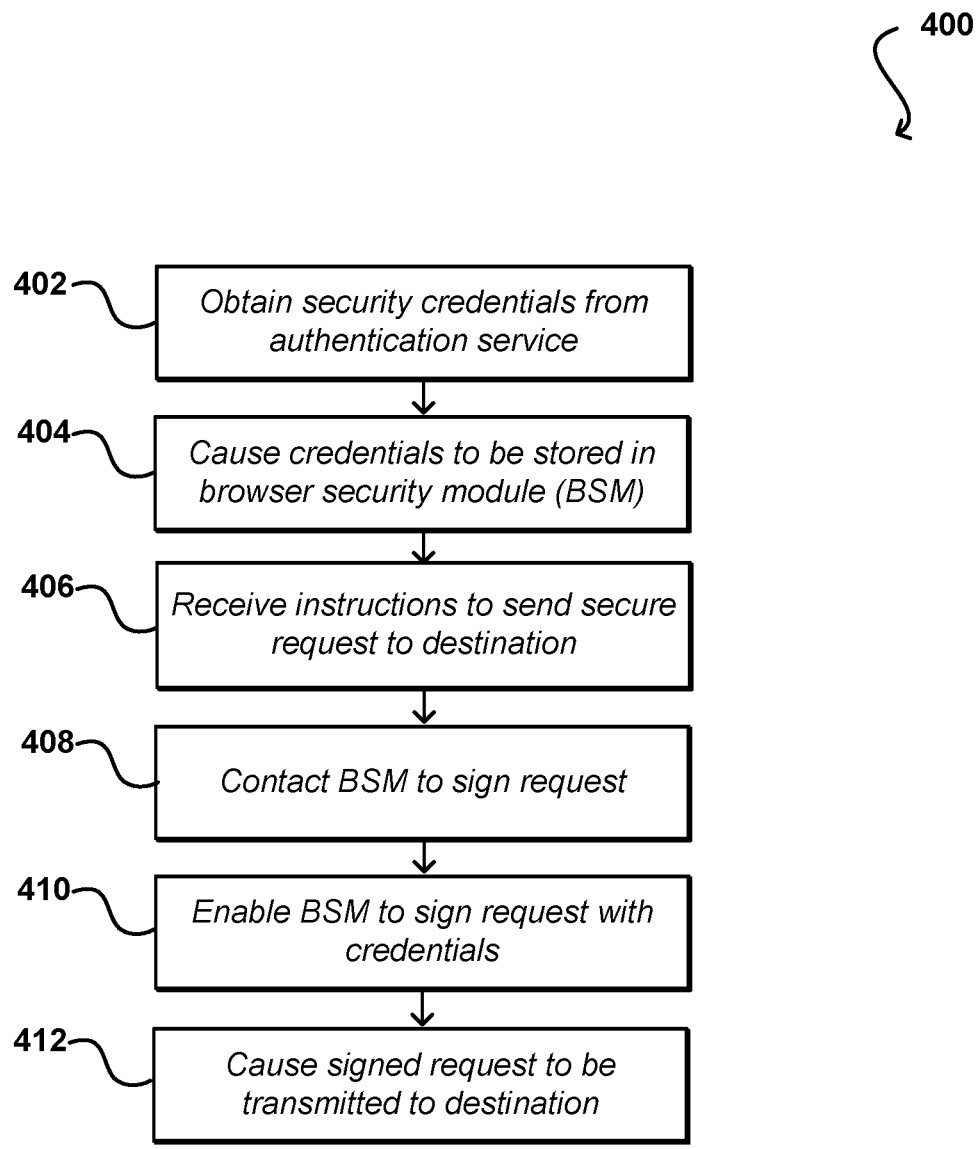
FIG. 4 illustrates a second example process for enabling a request to be authenticated in accordance with various embodiments.

FIG. 4 illustrates an example process 400 for using a browser security module to manage secure information in accordance with various embodiments. In this example, a set of security credentials can be received 402 from an authentication service or other such source. As discussed above, the credentials can be received in response to a request to access Web services or another such action. Upon receiving the credentials, a script executing on the client device can cause 404 at least a shared secret (e.g., a key provided from an authentication service) in the credentials to be stored to a browser security module (BSM). While the shared secret is stored in the BSM, instructions can be received 406 to send a secure request to a destination associated with the shared secret. In response, script executing on the client device can contact 408 the BSM with information for the request, enabling 410 the BSM to sign the request using the stored shared secret (e.g., the key). Once signed, the request can be caused 412 to be sent to the destination, such as by utilizing a flash proxy or other such component. As mentioned, in some embodiments the BSM might cause the shared secret to be included in a client token to be sent with the request, where the token is encrypted using a key known to a second server or other recipient receiving the message. Such an approach can enable the authorization to be "stateless" in at least some embodiments because the second server never needs to store a copy of the shared secret as long as the secret is passed with the request in the encrypted token. In other embodiments, the second server can know the shared secret such that no encrypted token need to be sent with the request, and the request can instead be authenticated using the fact that the request was signed with the secure secret. Various other approaches can be used as well as should be apparent in light of the teachings and suggestions contained herein.

In another example, a user might want to login to a banking application to perform an action such as a bill payment or account transfer. The user might be presented with a login form enabling the user to enter security information, such as a username and password or other such information as known in the art. The JavaScript or other script executing on the client device can request that the BSM generate a security key and sign a request to be sent to the banking service with that security key. In some embodiments, the generated security key can be written to a token that can be encrypted with the bank's public key. The generated security key then can be sent in the encrypted token to the banking service, which can use that security key as a session key that has not been exposed to any third party. In at least some embodiments, the encrypted session key can be sent using a proxy such that the JavaScript does not have access to the encrypted session key for purposes of potentially directing that key to an unintended destination. In other embodiments, the JavaScript might add a signature to each request for the banking transaction that includes the encrypted key generated in the BSM, but the JavaScript will not have access to an unencrypted version of the key.

The BSM itself can be a module implemented as software that in some embodiments may also have one or more hardware components. A BSM can have at set of well-defined interfaces that enable communication with various components across one or more domains. The BSM can be associated with one or more specific browser applications, and can have bindings to specific types of active content or active script, such as JavaScript or Flash, to enable credentials to be managed by the BSM on behalf of that content. The security module in at least some embodiments can generate or receive credentials to be stored, and can enable a set of defined operations to utilize, but not have direct access to, those credentials. For example, active content executing in the browser can ask the BSM to sign a request using a key, for example, but obtain the key from the BSM.

In at least some embodiments the credentials can be utilized by components, scripts, or users in domains other than the domain from which the credentials were originally received or caused to be generated. In some embodiments, the BSM can enable different permissions to be defined (at least within the context of the browser) for different domains and/or different content in a common domain. In some embodiments, cross-domain communication can be enabled via the BSM, which might otherwise be restricted by the corresponding browser application. A user might be able to selectively determine a context in which cross-domain permissions can be granted, domains for which such restrictions can be relaxed, etc.

In one example, a BSM on a client device can generate a public/private key pair in response to a request from active content executing in a browser application on the client. The public key can be provided to the active content, but the private key will not be exposed outside the BSM (or at least exposed to the active content). The public key can be caused to be signed by an authority, for example, which can provide and/or bind an identity to the private key within the BSM. Since the private key is not exposed outside the BSM, the private key cannot be obtained outside that machine or context. A user can request that the BSM generate a signature based on the private key, then a request with the public key and signature can be sent to a recipient who can verify (e.g., by normal PKI infrastructure) an identity of the sender. The private key can also be used for other functions as well, such as to encrypt data or other such information.

In some embodiments, the BSM can be used to implement a key transfer mechanism. For example, the BSM might receive a request to be signed or otherwise processed, and can modify the request to indicate a public key under which a response directed at the BSM should be encrypted. An entity receiving the request can generate and send an appropriate response that is encrypted with the indicated public key, such that the key can be communicated from the application server receiving the response to the BSM.

The BSM in at least some embodiments functions as an interfacing mechanism that enables applications or content rendered in a browser to utilize credentials that cannot otherwise be accessed by those applications or that content. In some instances, the type of content attempting to utilize the credentials might not matter. For example, a secure channel might be established between the user and the browser that is not subject to manipulation by Web content. Such a channel can enable the user to enter material to be used as a security credential, such as a password or private key. The credentials then are stored in the BSM and can be utilized by components such as servers or services on the Internet that do not have a direct network path to the BSM, to transmit other secrets to the BSM. The secure channel can also be used to transmit and/or manipulate policies defining how the credentials can be used, as may be specified by a user and/or issuer of the credentials. A secondary secure channel to the browser channel can also be established in some embodiments between the issuer of the secret and the BSM, such the credentials may be generated and transmitted through a stack of layers.

Furthermore, the BSM might, in addition to a trusted path for the entry of secrets, have a similar trusted path for the manipulation of metadata about the authorized use of the credentials. One or more interfaces or other such mechanisms can be provided to prompt the user on the first use, or every use, of a credential in a particular context. Additionally, the user of a trusted path with a BSM ensures that a password or other secret entered into the BSM can be used to derive a key to sign the authentication process, but is never be transmitted across the Internet (i.e., "over the wire"). The BSM can also generate one time passwords (OTPs) or site-specific passwords, as may be derived from a common password. The use of a trusted path for entry of a secret enables the BSM to intercept and modify login exchanges to transparently generate and set a site-specific password from using a credential stored in the BSM, such that other instances of the browser can re-derive those keys upon presentation of a credential (e.g., user password that is not shared with any other site. Such an approach can, for example, help to mitigate phishing attacks.

In some embodiments, a BSM can be used as a type of identity provider. For example, a user might have a first identity, associated with a secret stored by the BSM, that is shared across multiple social networking sites. The user might have a separate identity profile or space that is shared with other sites or entities, such as banks or health care providers. The user can have control over the number and configuration of each identity space, and can enable access or use with certain entities.

A BSM also can be used with the sharing of data or other such information. For example, a third party entity might want to interact with a Web site for a user's resources. The site can cause a secret to be stored in the BSM, and the user interacting with the third party entity can enable the third party to utilize that secret. For example, a user can use the BSM to establish one or more credentials with a provider of content, and enable the Web site to utilize the credentials such that the external Web site can obtain resources from the provider. Such an approach can enable the sharing of data (encrypted or otherwise) between various sites, entities, or providers. In some embodiments, the BSM can itself function as a provider, where the BSM brokers the interaction with the third party attempting to obtain access to credentials stored in the BSM. The user can again delegate access, but in this case the BSM would be the provider of data to the Web site consumer.

A BSM might not have bindings to active content in all embodiments, but might have a well-defined interface enabling communications to be provided to the BSM to cause the BSM to perform a desired function. In some embodiments, an API might be exposed to the active content to enable the BSM to perform an operation on behalf of the active content.

In many of the situations discussed above, active content or another such entity is able to request that a BSM perform an action using specific credentials, such as to sign a message and return the signed message to the active content. The active content is then responsible for using that result to send a signed message and/or construct other messages. Such an approach might not provide an optimal level of security in all cases, however, as the active content has access to the signed message and can send the signed message to any destination, which might be a different destination that was originally intended or authorized. Content executing in a browser can be compromised, such that signed requests can be caused to be sent to unauthorized or otherwise undesirable recipients.

Approaches in accordance with various embodiments enable a browser security module to inspect and modify messages such as HTTP requests and responses as those messages are being transmitted. For example, the BSM might sit along a transmission path such that the BSM can intercept outbound requests constructed by active content in the browser, as well as inbound responses (or other inbound messages) before those responses are received by the active content. For example, the active content can construct a request to a defined server, where that request includes information indicating that the request is to be signed using a specific key or credential stored by the BSM. When the request is intercepted by the BSM, the BSM can pre-process the request to replace that information with an actual signature using the indicated key. Such an approach enables the BSM to determine where the request is being sent and prevent the active content from sending the signed request to other locations. Modeling the BSM as a transform of messages (or message filter) enables a user to constrain how results are used because the active content never has access to the results of the signing process. Similarly, a response that is received for the active content can be pre-processed by the BSM to remove any signing or credentials from the inbound response.

In embodiments where the BSM sits along a secure channel operable to modify inbound and outbound messages, various policy compliance functionality can be implemented as well. In an example where the processes execute on the client computer, the BSM can make a record or log entry for all the encryption or signature attempts that are made. The user can then access those records or logs to determine which sites are using which keys, or attempting to use keys, in order to ensure that proper access controls are in place. In some embodiments, the BSM might be operable to generate audit logs and publish those logs to an appropriate service or other location. In some embodiments the BSM can hold the private key used to sign the audit logs.

In embodiments where there are secure channels from the user to the BSM and from remote servers to the BSM, a subset of those remote servers might not be related to sites the user is visiting but might instead be administrative in nature, such as corporate IT administration servers. Those administrative servers might also want to set policies with respect to the user of certain credentials, as well as data loss prevention policies and the like. Some such approaches might take advantage of hardware backing or mechanisms for locking the user out of administrative privileges. Such policies can, for example, restrict disclosure via control of the outbound traffic. For example, a BSM intercepting an outbound message can detect that something is being disclosed, and can block unauthorized disclosure. The BSM then can also write the attempt and/or blocking to a log file or other such location, and in some cases can cause a user or person associated with the corporate IT department of the attempt. The BSM is uniquely positioned to perform this function well, as it has visibility into SSL traffic without any unnatural acts, as opposed to, for example, SSL intercept proxies.

In order to perform filtering in at least one embodiment, the BSM can function as a component of the Web browser, along with other components such as a rendering engine, a JavaScript engine, a request engine, and the like. One or more components of the browser will construct requests, and as one of the last steps in constructing the request the processing and/or filtering by the BSM can be performed. Responses received to the browser can similarly go through a filtering pipeline of components before being passed to active content executing in the browser. In other embodiments, the processing of a response by the BSM can be performed after the active content processes the response but before that information is provided by the active content to the user. Such approaches prevent the data that is being communicated to the user from being intercepted or manipulated by the active content. In at least some embodiments the pipeline is part of a trusted path between the display device, the input device, and the remote server. Active content such as JavaScript can process some of the content within the page, but the BSM can intercept that content before (or after) the content it is rendered. Even when the content is intercepted after rendering, however, the JavaScript never has access to the protected content and thus cannot push that content out somewhere else.

As an example, a credit card form might be placed on a Web page to be rendered in a browser on a client device. As mentioned, there are various components involved in the rendering of Web content, which can each have different trust level and potentially be at risk to perform unintended actions. A user might enter credit card information in the form that is encrypted by a BSM using an appropriate key such that none of the intermediate Web fleets, even though they can be the terminus of the secure (e.g., SSL) connection, can obtain the information. Such an approach can be done in a way that is visible to the user, and can be accomplished by putting the BSM filter in before rendering. The page could include tags that indicate certain fields in the form are to be used to collect data encrypted under keys established for this use. The browser then can display a special UI that is not available under control of the Web site to collect that data. The BSM then can encrypt the data under those keys before transmitting the data. The BSM in at least some embodiments could give the encrypted data back to the active content, and the active content could send a request to the Web service with the encrypted data. On an inbound version where the processing is done just before rendering, the JavaScript (or other active content) can get the information needed for rendering. At least one of those fields might include content that has no meaning or is encrypted, etc. The BSM can intercept the content before rendering and fill in any appropriate field with information decrypted using the appropriate key or credentials. The decrypted information then can be displayed on the screen without being accessible to the JavaScript. The rendering can also be done in such a way that, for at least some embodiments, direct DOM access would not show the cleartext but could include control tags to prevent or limit access.

Figure 5:
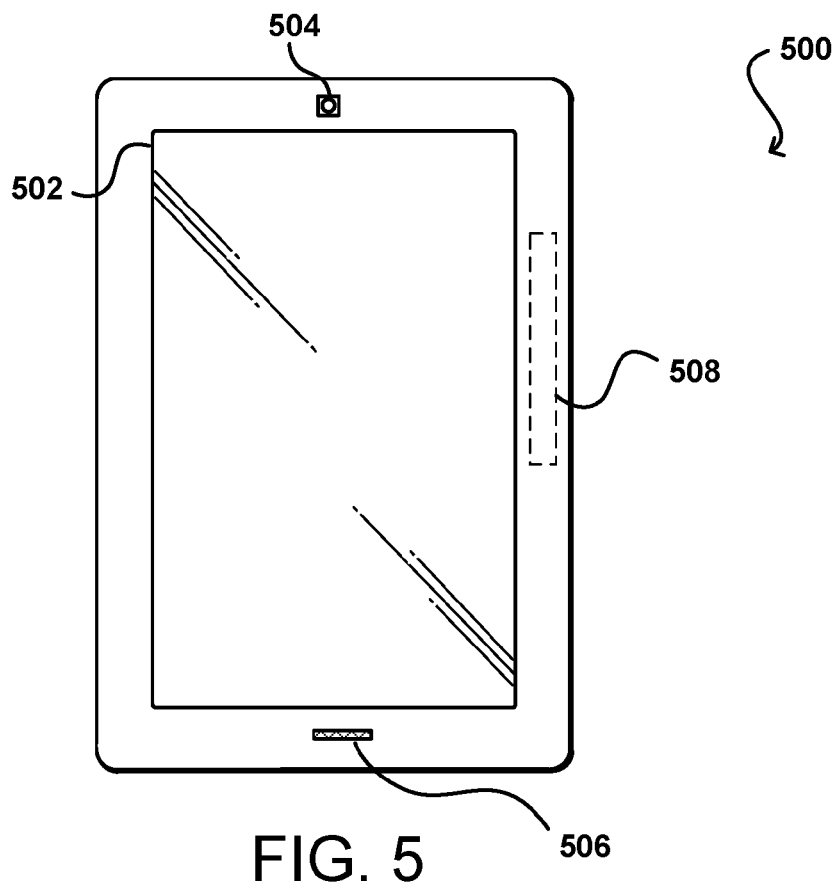
FIG. 5 illustrates an example client device that can be used to implement aspects of the various embodiments.

FIG. 5 illustrates an example electronic user device 500 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 500 has a display screen 502 operable to display information to a user facing the display screen (e.g., on the same side of the computing device as the display screen). The computing device can include various elements enabling a user to provide input to the device, such as a touch-sensitive display screen 502, at least one camera 504, a microphone 506, a keyboard or touchpad, or other such elements. The example computing device 500 also includes at least one communication mechanism 508 enabling the device to send and receive communications over at least one network. These networks can include, for example, a local area network (LAN), the Internet, an intranet, a cellular network, a wireless data communications network, and the like. In some embodiments, the computing device can also include at least one secure input LED or other such element operable to indicate when input is currently being fed into the BSM, as opposed to "normal" input.

Figure 6:
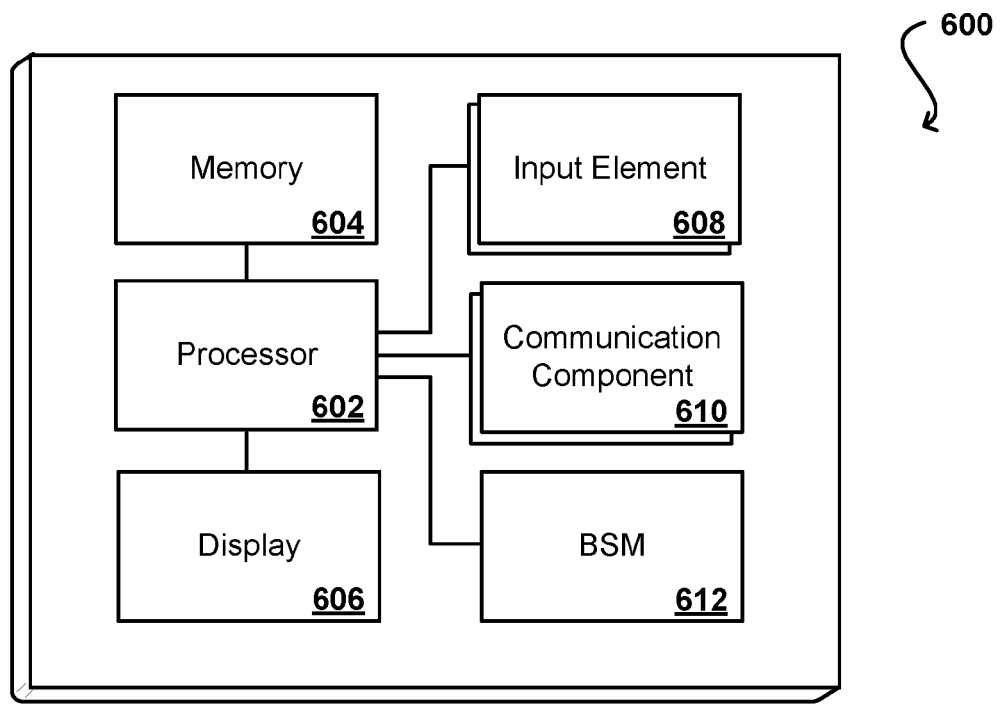
FIG. 6 illustrates example components of a client device such as that illustrated in FIG. 5.

FIG. 6 illustrates a logical arrangement of a set of general components of an example computing device 600 such as the device 500 described with respect to FIG. 5. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more communication elements 610, such as a Wi-Fi, Bluetooth, RF, wired, or wireless communication system. The device in many embodiments can communicate with a network, such as the Internet, and may be able to communicate with other such devices. The device 600 also can include at least one security module 612, which can be implemented through hardware and/or software. The security module can take the form of a hardware chip, a module in an operating system, a plug-in card, an external TCP/IP security device, or another such component as discussed elsewhere herein.

Figure 7:
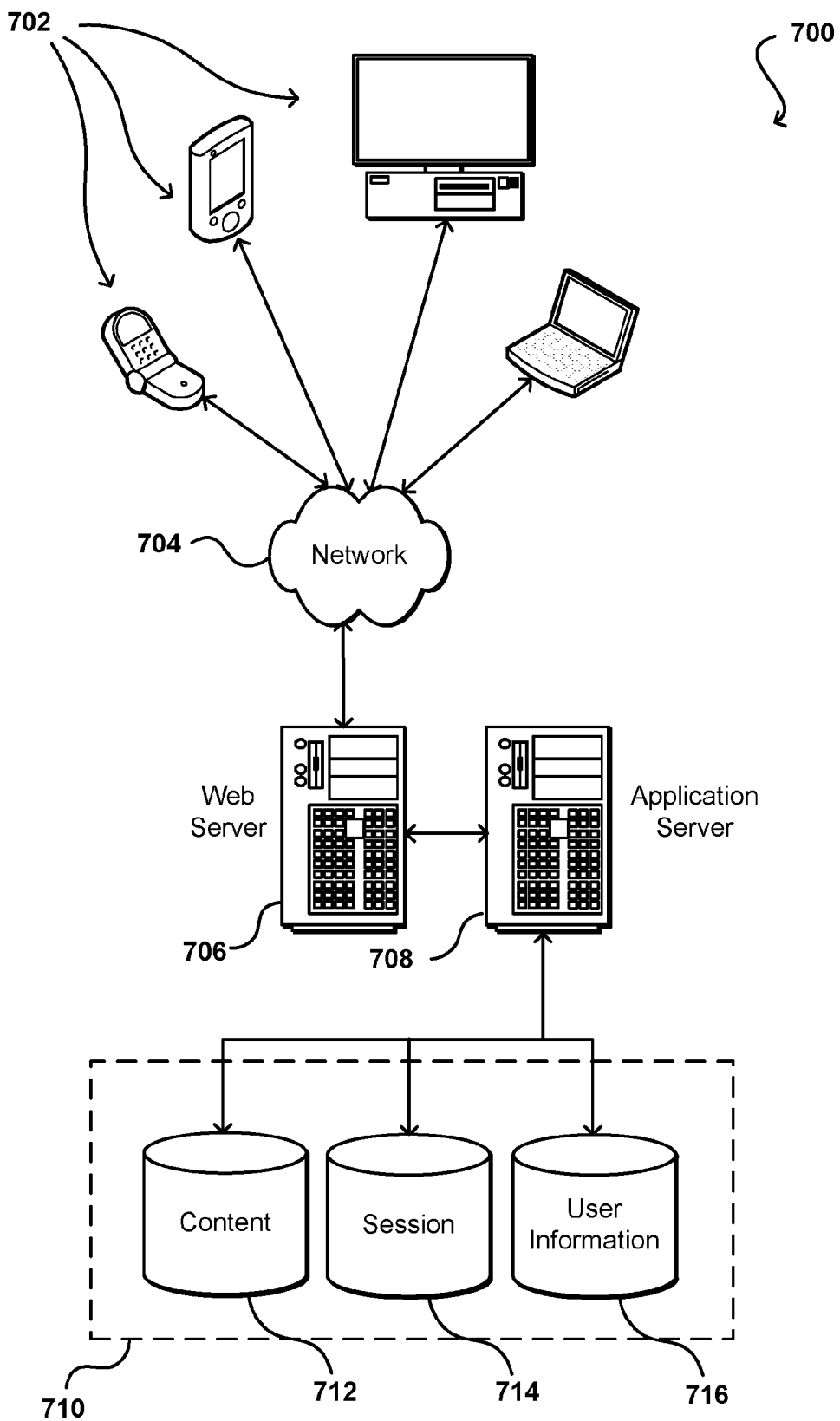
FIG. 7 illustrates an environment in which various embodiments can be implemented.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
receiving a secure key via a link received at a browser on a client device from an authentication server;
receiving first active content at the browser;
executing the first active content, wherein the first active content causes the secure key to be stored in a security module associated with the browser, the security module having an interface enabling active content executing in the browser to cause the security module to perform one or more operations using the secure key;
receiving, at the browser, second active content associated with a domain, the second active content, when executed, contacting the security module;
performing, by the security module, an operation of the one or more operations using the secure key, the operation based at least in part on a characteristic of the second active content or the domain associated with the active content; and
enabling the second active content to obtain a result of the operation from the security module and send a request using the result to a server to obtain content from the server upon authentication by the server that the result was produced using the secure key, without exposing the secure key to the second active content.

2. The computer-implemented method of claim 1, wherein the security module has bindings to one or more types of active content or active script, the one or more types of active content or active script enabling the secure key to be managed by the security module.

3. The computer-implemented method of claim 1, further comprising:
receiving, by the security module, an outbound request to a server generated by the active content, the outbound request including information indicating the outbound request is to be signed using a specific key or credential stored at the security module;
replacing, by the security module, the information with a signature generated at least in part using the specific key or credential; and
causing, by the security module, the outbound request with the signature to be sent to the server.

4. The computer-implemented method of claim 1, further comprising:
receiving, by the security module, an inbound message to the active content, the inbound message including at least one of a credential or signature;
removing, by the security module, the at least one of a credential or signature from the inbound message; and
sending, by the security module, the inbound message to the active content.

5. The computer-implemented method of claim 1, further comprising:
receiving the secure key to the client device through a secure channel to the security module, the secure channel being inaccessible to the active content.

6. The computer-implemented method of claim 1, wherein the security module is operable to provide an encrypted token including the secure key with the result, the active content being unable to decrypt the encrypted token to access the secure key.

7. The computer-implemented method of claim 1, wherein the secure key is obtained by the client device by using a link fragment provided to the client device.

8. The computer-implemented method of claim 1, wherein a user is able to communicate with the security module using a first secure channel for the entry of secure information and using a second secure channel for the manipulation of metadata pertaining to an authorized use of the secure information.

9. The computer-implemented method of claim 1, wherein the result includes at least one of a request signed using the secure key, a request verified using the secure key, data encrypted using the secure key, or data decrypted using the secure key.

10. A computer-implemented method, comprising:
receiving a set of security credentials via a link received a browser on a client device from an authentication server;
receiving first active script at the browser,
executing the first active script, wherein the first active script causes the set of security credentials, including at least a secure key encoded by a client token, to be stored in a security module associated with the browser, the security module having an interface enabling active content executing in the browser to cause the security module to perform one or more operations using the secure key;
receiving second active content, wherein the second active content, when executed in the browser, contacts the security module to produce a result using the secure key, the result including the client token;
performing, by the security module, an operation of the one or more operations using the secure key, the operation based at least in part on a characteristic of the second active content;
enabling the active content executing in the browser to receive-the result of the operation from the security module, without exposing the secure key to the second active content; and
sending, via the second active content, a request using the result to a server to obtain content upon authentication by the server that the result was produced using the secure key.

11. The computer-implemented method of claim 10, wherein the secure key is received through a secure channel from a user or generated by the security module.

12. The computer-implemented method of claim 10, wherein the security module has bindings to one or more types of active content or active script, the one or more types of active content or active script enabling the secure key to be managed by the security module.

13. The computer-implemented method of claim 10, wherein the result includes at least one of a request signed using the secure key, a request verified using the secure key, data encrypted using the secure key, or data decrypted using the secure key.

14. The computer-implemented method of claim 10, wherein the secure key is obtained from an authentication entity through use of a fragment of the link provided to the client device.

15. The computer-implemented method of claim 10, wherein a user is able to communicate with the security module using a first secure channel for the entry of secure information and using a second secure channel for the manipulation of metadata pertaining to an authorized use of that secure information.

16. The computer-implemented method of claim 10, wherein the active content executing in the browser is determined to be able to contact the security module to produce a result using the secure key based at least in part upon at least one policy associated with the secure key.

17. The computer-implemented method of claim 10, wherein the browser and the active content are unable to access at least the secure key, the active content operable to contact the security module to sign the result using the secure key and to submit the result to the security module.

18. A computing device, comprising:
a device processor;
a security module associated with a browser application on the computing device; and
memory including instructions that, when executed by the device processor, cause the computing device to:
receive a secure key via a link at a browser on a client device;
receive first active content at the browser;
execute the first active content, wherein the first active content causes the secure key to be stored in a security module associated with the browser, the security module having an interface enabling active content executing in the browser to cause the security module to perform one or more operations using the secure key;
receive, at the browser, second active content, the second active content, when executed, contacting the security module to produce a result using the secure key;
perform, by the security module, an operation of the one or more operations using the secure key, the operation based at least in part on a characteristic of the second active content;
enable the second active content to receive the result of the operation without exposing the key to the active content; and
sending, via the second active content, a request using the result to a server to obtain content upon authentication by the server that the result was produced using the secure key.

19. The computing device of claim 18, wherein the secure key is obtained from an authentication entity through use of a fragment of the link provided to the client device.

20. The computing device of claim 18, wherein the instructions, when executed, further cause the computing device to:
enforce at least one policy indicating which active content of a plurality of active content is permitted to perform certain operations using the secure key.

* * * * *